United States Patent
Koessler (10) Patent No.: US 7,229,239 B2
(45) Date of Patent: Jun. 12, 2007

(54) CHANNELED SUBSTRATES FOR RECEIVING THREADED FASTENERS

(75) Inventor: Juergen Koessler, Vancouver (CA)

(73) Assignee: Primex Manufacturing Ltd., Langley, British Columbia (CA)

( * ) Notice: Subject to any disclaimer, the term of this patent is extended or adjusted under 35 U.S.C. 154(b) by 360 days.

(21) Appl. No.: 10/841,533

(22) Filed: May 10, 2004

(65) Prior Publication Data

US 2005/0247849 A1 Nov. 10, 2005

(51) Int. Cl.
*F16B 37/00* (2006.01)
(52) U.S. Cl. ...................................... 411/437
(58) Field of Classification Search ............... 411/437, 411/310
See application file for complete search history.

(56) References Cited

U.S. PATENT DOCUMENTS

| | | | | |
|---|---|---|---|---|
| 2,200,227 A * | 5/1940 | Olson | ........................... | 52/364 |
| 3,030,997 A * | 4/1962 | Collins | ........................ | 411/301 |
| 3,099,335 A * | 7/1963 | Sklar | ........................... | 52/364 |
| 3,564,666 A * | 2/1971 | Dold | ........................... | 24/320 |
| 4,599,484 A * | 7/1986 | Bramwell | ..................... | 174/50 |
| 4,708,554 A * | 11/1987 | Howard | ......................... | 411/84 |
| 6,953,314 B2 * | 10/2005 | Magagna | ..................... | 411/433 |

OTHER PUBLICATIONS

Description of RNI-3615-SR Double Door Plastic Demarcation Enclosure Special Resistance Material (online product catalog of Multilink Broadband Inc., Elyria, USA)—2 pages.
Description of RNI-3600-TS Single Door Plastic Demarcation Enclosure with Locking Terminator (online product catalog of Multilink Broadband Inc., Elyria, USA)—2 pages.

* cited by examiner

*Primary Examiner*—Flemming Saether
(74) *Attorney, Agent, or Firm*—Oyen Wiggs Green & Mutala LLP (57) ABSTRACT

A fastener receiving member has a substrate which comprises channels for receiving one or more threaded fasteners. The channels permit positional adjustment of the threaded fasteners and positional adjustment of other components secured by the threaded fasteners relative to the fastener receiving member. Each channel comprises a pair of opposing sidewalls which are spaced apart from one another and which are preferably formed from a relatively soft material, such as plastic. When a fastener is rotatably driven into a channel, the threads of the fasteners deform the material of the opposing sidewalls to form deformations in the sidewalls. The threads of the fastener and the deformations formed by the threads in the sidewalls of the channel cooperate to retain the fastener in the channel.

34 Claims, 10 Drawing Sheets

CHANNELED SUBSTRATES FOR RECEIVING THREADED FASTENERS

TECHNICAL FIELD

The invention relates to fastening in general. The invention has application in fastening components in place with threaded fasteners.

BACKGROUND

There are various situations where components of some kind must be attached to a substrate. Screws are often used for this purpose, especially in cases where the components may need to be removed and/or replaced in the field. For example, telephone systems, cable television systems and the like typically include junction box enclosures which house components, such as chokes, switches, filters, terminal connectors, junction blocks, and the like. Service personnel occasionally need to remove and replace these components in the course of maintaining or upgrading the system.

A junction box enclosure may be equipped with threaded holes for holding components intended to be housed in the enclosure. A problem is that it is expensive to fabricate threaded holes. Another problem is that a junction box enclosure manufactured with threaded holes in specific locations to accommodate one set of components is not readily adapted in the field to accommodate a different arrangement of components or to accommodate replacement components having mounting holes in positions different from those of a component being replaced.

A junction box enclosure may be fabricated from a relatively soft material, such as wood for example, so that screws for holding components can be driven directly into the body of the enclosure. A drawback of this approach is that wood can rot, is flammable, and has other characteristics making it undesirable for use in many situations. Another drawback with this approach is that a large number of holes in the body of the junction box enclosure tend to weaken or destroy the structural integrity of the enclosure. Furthermore, it may be difficult to reposition a component so that its mounting screws will be close to, but not in the same place, as existing holes.

Another possible way in which fasteners may be used to mount a component in a junction box enclosure involves providing preformed holes at a plurality of locations in the body of the enclosure and screwing screws into appropriate ones of the preformed holes to mount the component. This approach lacks flexibility. The component can only be mounted at locations corresponding to the locations of the preformed holes.

It would be desirable to provide a mechanism for fastening components in place which is flexible, can be provided in a cost effective manner, and avoids or ameliorates at least some of the disadvantages of existing fastening mechanisms.

SUMMARY OF THE INVENTION

Aspects of this invention provide fastener receiving components having substrates which comprise one or more channels for receiving threaded fasteners. A threaded fastener can be received at any location along any of the channels. This allows components to be mounted to the substrate at desired positions along any of the channels and allows the positions at which components are mounted to be adjusted.

In some embodiments, a fastener receiving component is provided in the form of a plate component having a substrate in which one or more fastener receiving channels are defined. The plate component may be coupled to another surface, such as the inside wall of a junction box or other enclosure, for example. In other embodiments, fastener receiving components comprise one or more walls of a junction box enclosure. The one or more walls of the junction box enclosure provide a substrate in which one or more fastener receiving channels are defined. Preferably an area of the substrate comprises a plurality of spaced apart channels which extend parallel to one another.

Each channel is defined between a pair of opposing sidewalls. The sidewalls are spaced apart from one another and are preferably formed from a deformable material, such as plastic for example. Rotational insertion of each fastener into the channel forms deformations of the sidewall material. The deformations and the threads of the fastener cooperate to retain the fastener between the sidewalls.

One particular aspect of the invention provides a member having a substrate for receiving threaded fasteners at various locations. The substrate comprises a pair of sidewalls which extend parallel to one another in a first channel direction and which are transversely spaced apart to define an elongated first channel therebetween. One or more threaded fasteners are rotatably insertable through a channel opening and inwardly into the channel at one or more corresponding locations along the channel. The sidewalls of the channel are formed from a deformable material, such that rotational insertion of each fastener into the first channel forms deformations in the sidewall material. The deformations and the threads of the fastener component cooperate to retain the fastener between the sidewalls.

The substrate may comprise a plurality of first channels. The sidewalls and the channels may have various configurations and geometries. The substrate may comprise stiffening elements that extend between the transversely across a channel between the sidewalls. The sidewalls preferably comprise a plastic material.

Another aspect of the invention provides generally planar member for mounting a plurality of components. The member comprises a substrate populated by a plurality of elongated channels which extend in a channel direction and which are spaced apart from one another in a transverse direction by a distance that is in a range of 0.5 to 10 times greater than an average transverse width the channels. Each of the channels are defined between a pair of sidewalls comprising a deformable material.

Further features and applications of specific embodiments of the invention are described below.

BRIEF DESCRIPTION OF THE DRAWINGS

In drawings which depict non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Aspects of this invention provide fastener receiving components having substrates which comprise one or more channels for receiving threaded fasteners. A threaded fastener can be received at any location along any of the channels. This allows components to be mounted to the substrate at any desired positions along any of the channels and allows the positions at which components are mounted to be adjusted. In some embodiments, a fastener receiving component is provided in the form of a plate component having a substrate in which one or more fastener receiving channels are defined. The plate component may be coupled to another surface, such as the inside wall of a junction box or other enclosure, for example. In other embodiments, fastener receiving components comprise one or more walls of a junction box enclosure. The one or more walls of the junction box enclosure provide a substrate in which one or more fastener receiving channels are defined. Preferably an area of the substrate comprises a plurality of spaced apart channels which extend parallel to one another in a channel direction.

Each channel is defined between a pair of opposing sidewalls. The sidewalls are spaced apart from one another and are preferably formed from a relatively deformable material, such as plastic for example. In some embodiments, the surfaces of the opposing sidewalls are parallel to one another along a channel direction and converge toward one another as they extend in a generally inward direction. In such embodiments, the channels are wider at their channel openings and narrower at their innermost extents. In other embodiments, the surfaces of the opposing sidewalls are parallel to one another as they extend in the inward direction. In still other embodiments, the sidewalls of the channels are shaped to provide the channels with other cross-sectional profiles.

Figure 1:
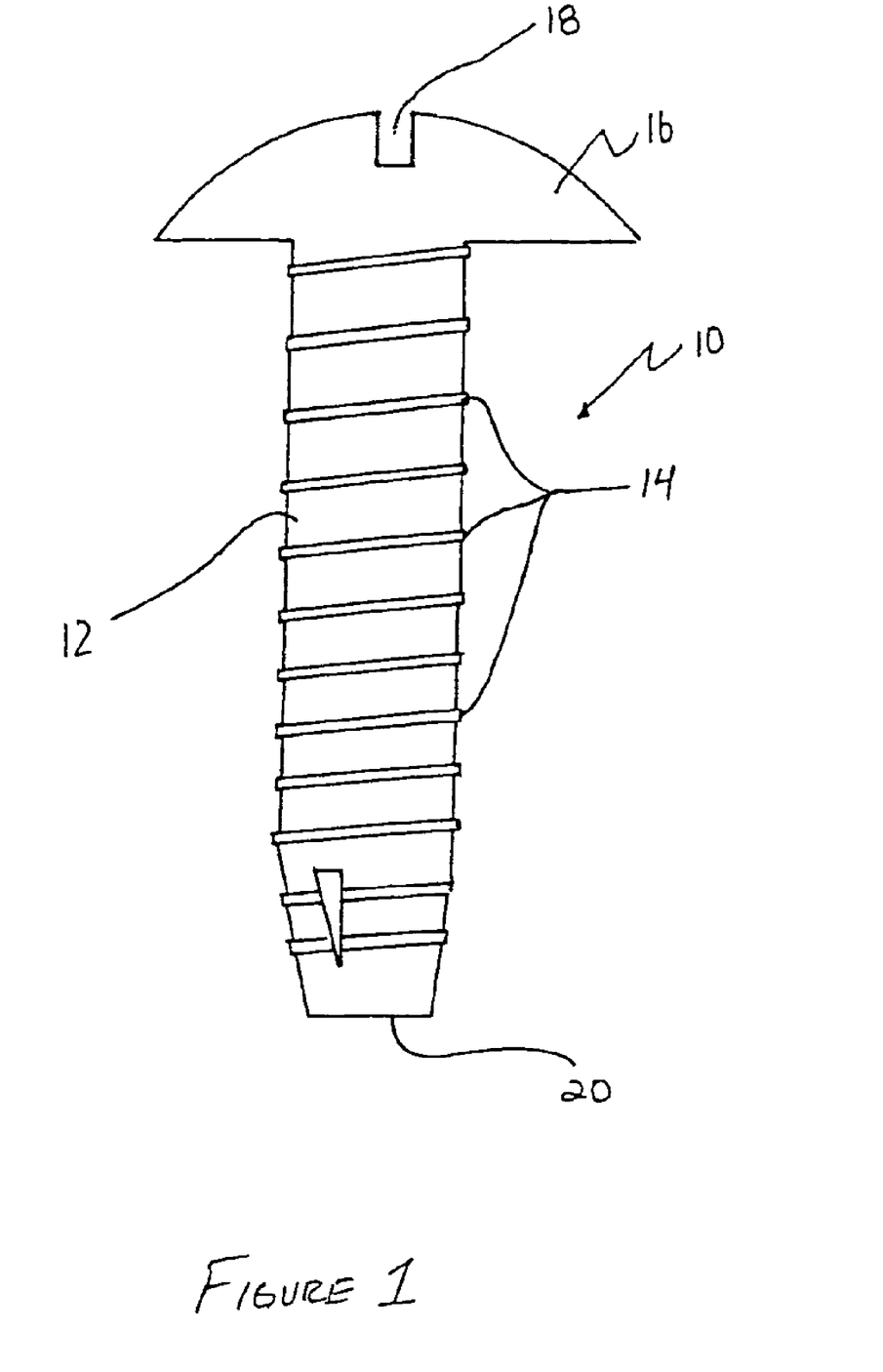
FIG. 1 is a plan view of a typical threaded fastener.

FIG. 1 shows a screw 10 of a type that may be used to fasten components to a fastener receiving component in accordance with the invention. Screw 10 comprises a shaft 12 having helical threads 14 and a head 16 having a tool-engaging portion 18. Shaft 12 is preferably tapered, at least in its portion near tip 20. Typically, screw 10 is made of a relatively strong material such as steel or some other metal. In accordance with the invention, a screwdriver or other tool (not shown) is coupled to tool engaging portion 18 to rotate screw 10 and to drive screw 10 into a channel of a fastener receiving component at a desired location. Preferably, but not necessarily, screw 10 is of the self-tapping variety.

When screw 10 is rotatably driven into a channel, threads 14 cut into (or otherwise deform) the relatively soft material of the opposing sidewalls to form corresponding deformations in the sidewalls of the channel. Such deformations may comprise indentations. Threads 14 and the deformations formed by threads 14 in the sidewalls of the channel cooperate to resist forces which would tend to pull screw 10 out from the channel.

FIGS. 2 to 4B depict various views of a base portion 111 of a junction box enclosure 110. Base portion 111 is a fastener receiving component which comprises a substrate 111A. Substrate 111A is shaped to define a plurality of fastener receiving channels 112 in accordance with a particular embodiment of the invention. Channels 112 may receive and secure threaded fasteners 10. In the illustrated embodiments of FIG. 2, substrate 111A also comprises a plurality of preformed holes 115 at spaced apart locations. Holes 115 may also receive and secure threaded fasteners 10. A lid (not shown) is attachable to base portion 111 to form an enclosure for housing components. Examples of junction box enclosures having lids and bases are shown in U.S. Design patent application Ser. No. 29/165,932 (filed 21 Aug. 2002), U.S. patent application Ser. No. 10/294,652 (filed 15 Nov. 2002) and U.S. patent application Ser. No. 10/656,117 (filed 8 Sep. 2003), which are hereby incorporated by reference.

Figure 2:
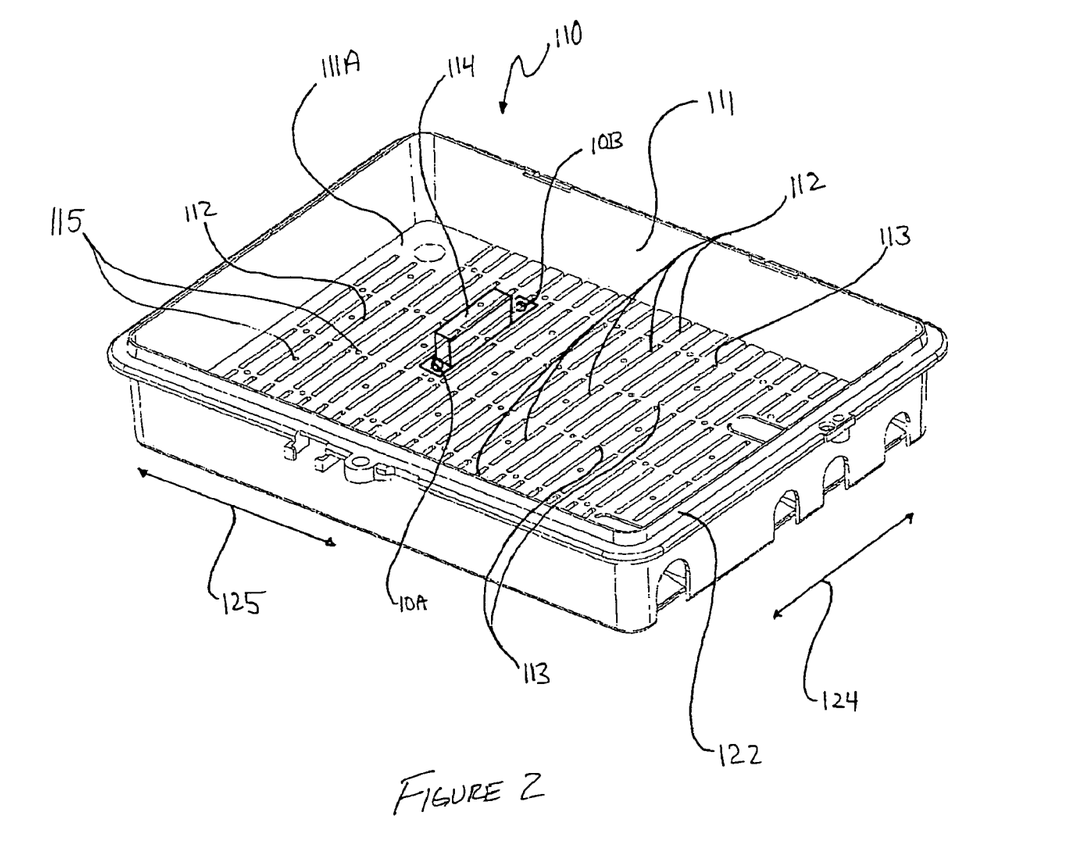
FIG. 2 is an isometric view of the base portion of a junction box enclosure comprising fastener receiving channels in accordance with a particular embodiment of the invention.

In the example embodiment of FIG. 2, a terminal connector 114 is mounted to substrate 111A by a pair of screws 10A, 10B which engage one of channels 112. It will be appreciated that terminal connector 114 could be installed at any of a wide variety of locations on substrate 111A since either one of screws 10A, 10B may be inserted at any location along any one of channels 112 or into any one of holes 115. Other components may be mounted to substrate 111A in a similar manner.

Figure 3:
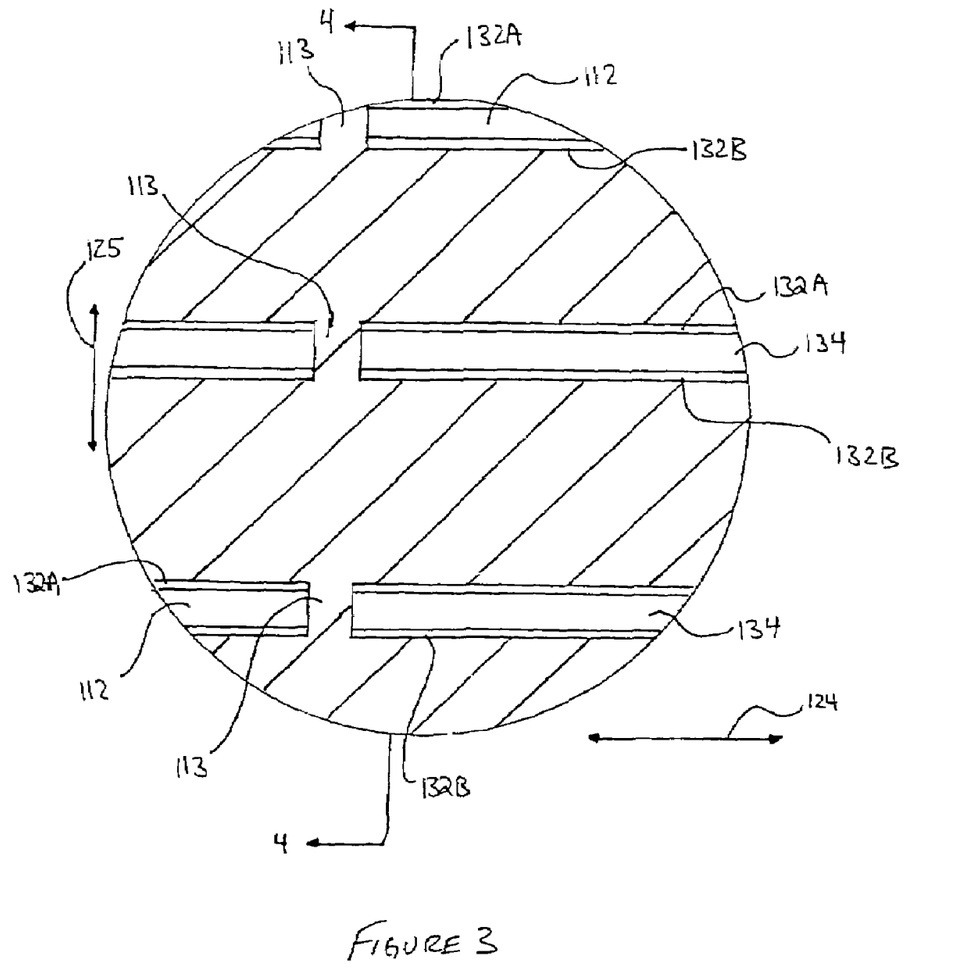
FIG. 3 is a partial plan view of the base of the FIG. 2 enclosure showing the fastener receiving channels therein.
Figure 4:
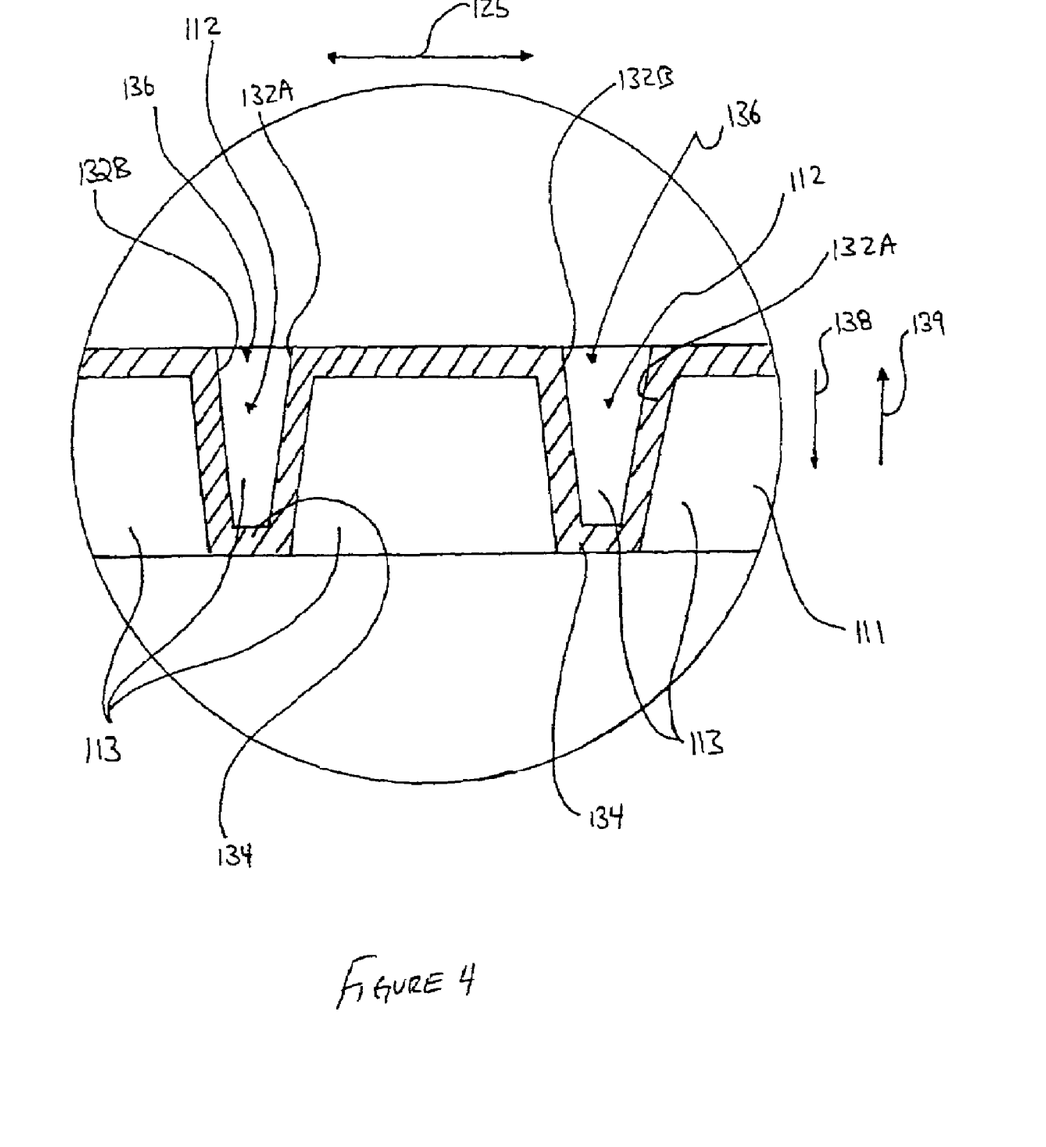
FIG. 4 is a partial cross-sectional view of the base of the FIG. 2 enclosure showing the fastener receiving channels therein.
Figure 4A:
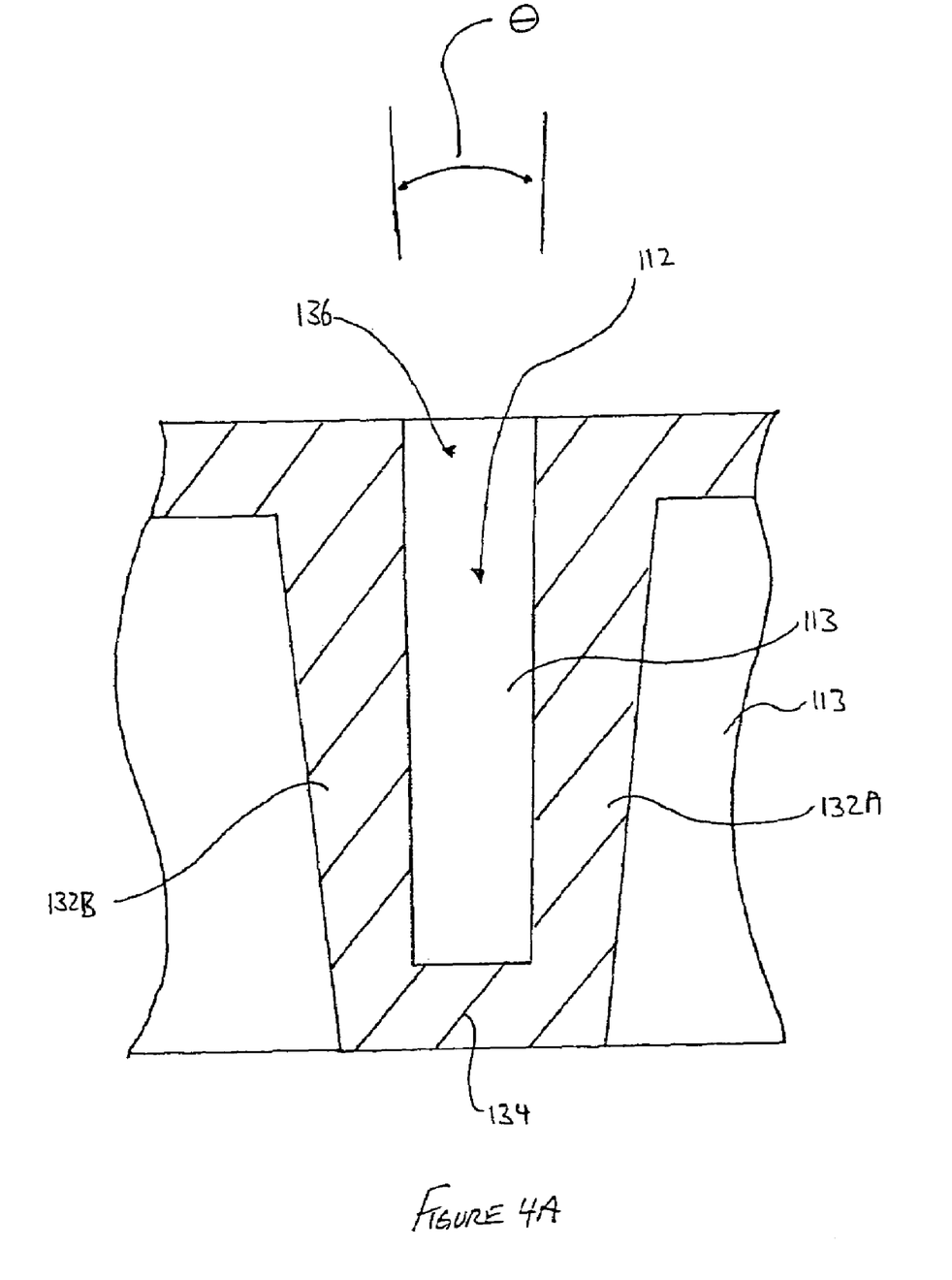
FIG. 4A is a close up cross-sectional view of a single channel in the FIG. 2 enclosure.

This description and the accompanying claims use a number of directional conventions to clarify their meaning. In a fastener receiving component that comprises one or more fastener receiving channels:

(i) "inner", "innermost", "inward", "inwardly", "inwardmost" and similar words are used to refer to a direction that is generally oriented toward a base (if present) of a channel 112 and is generally oriented toward a portion of channel 112 opposite to the channel opening into which fasteners project. Arrow 138 of FIG. 4 depicts the inward direction;

(ii) "outer", "outermost", "outward", "outwardly", "outwardmost" and similar words are used to refer to a direction that is generally oriented opposite to the inward direction. Arrow 139 of FIG. 4 depicts the outward direction;

(iii) the phrase "channel direction" refers to the direction in which a channel is 112 elongated. It is not necessary that the channel direction is linear. In some embodiments described further below, the channel direction may follow a curved path. Arrow 124 of FIGS. 2 and 3 represents an example of a channel direction; and (iv) "transverse", "transversely" and similar words refer to directions that intersect with the channel direction of a particular channel 112. Arrow 125 of FIGS. 2, 3 and 4 represents an example of a transverse direction.

Those skilled in the art will appreciate that these directional conventions are used for the sake of convenience and to simplify the corresponding description. These directional terms are not strictly defined and should not be interpreted narrowly.

Substrate 111A of FIGS. 2–4B comprises channels 112 which are straight and which extend parallel to one another in a channel direction indicated by arrow 124. Each channel 112 is spaced apart from its adjacent channel(s) 112 in a transverse direction indicated by arrow 125. In the illustrated embodiment, the spacing between adjacent channels 112 is periodic (i.e. channels 112 are equally spaced from one another). In other embodiments, the spacing between adjacent channels 112 varies. In some embodiments, the spacing between channels 112 is in the range of 0.5 to 10 times the average transverse width of each channel 112. In some embodiments the spacing between adjacent channels 112 is in the range of 1/8 of an inch to 6 inches. In general, it is desirable to have a small spacing between adjacent channels 112, because this provides more flexibility in positioning components on substrate 111A.

In the example embodiment shown in FIG. 2, the channel direction is parallel with the bottom edge 122 of enclosure 110. In other embodiments, channels 112 extend in different channel directions that may or may not be aligned with the sides of enclosure 110.

Figure 4B:
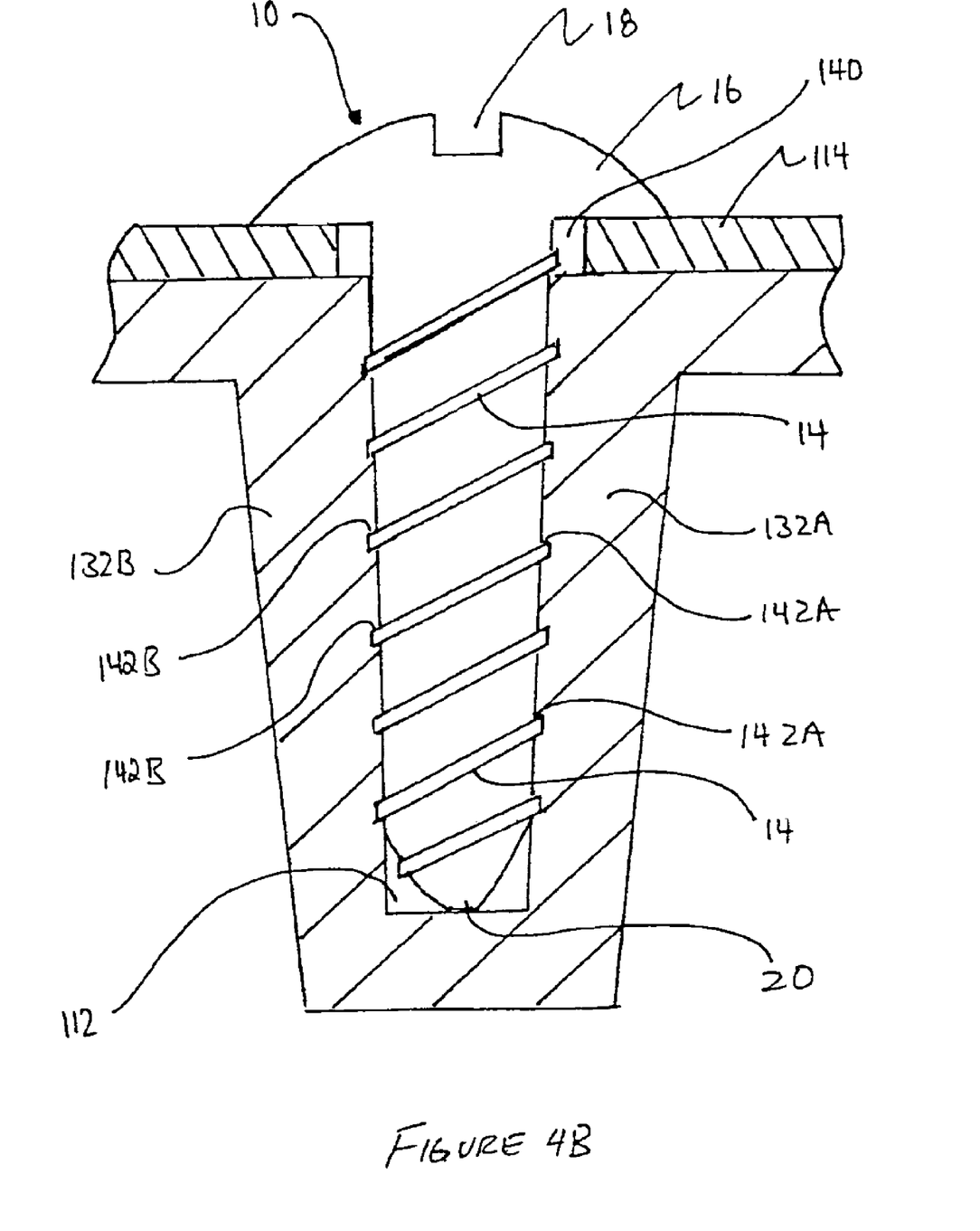
FIG. 4B depicts the channel of FIG. 4A with a threaded fastener received therein.

As shown in FIGS. 3–4B, each channel 112 comprises a pair of opposing sidewalls 132A, 132B, which extend in the channel direction and which are transversely spaced apart from one another to form a channel 112. In some embodiments, sidewalls 132A, 132B have a thickness in a range of 1/20 to 1/4 of an inch. In some embodiments, sidewalls 132A, 132B have a thickness in a range of 1/4 to 2½ times an average distance between sidewalls 132A, 132B. Each channel 112 optionally comprises a base portion 134. Base portion 134 extends transversely between the inner ends of sidewalls 132A, 132B to close the inner extent of channel 112. Sidewalls 132A, 132B define a channel opening or "mouth" 136 at the outermost extent of each channel 112.

In the illustrated embodiment of FIGS. 2–4B, each channel 112 is reinforced by a plurality of optional stiffening elements 113. Stiffening elements 113 extend transversely across channels 112 between sidewalls 132A, 132B. In the illustrated embodiment of FIGS. 2–4B, stiffening elements 113 also extend between adjacent channels 112, although this is not necessary. Stiffening elements 113 help to maintain the shape of sidewalls 132A, 132B and channels 112. Stiffening elements 113 may help to reduce the transverse deformation of sidewalls 132A, 132B when fasteners 10 are inserted into channels 112. In the illustrated embodiment of FIGS. 2–4B, each stiffening element 113 extends inwardly to base portion 134 and outwardly to channel opening 136. In other embodiments, stiffening elements 113 are recessed inwardly from channel opening 136 within their respective channels 112. In still other embodiments, stiffening elements 113 only extend inwardly a fraction of the full depth of their respective channels 112. As shown best in FIGS. 2 and 3, each channel 112 preferably comprises a plurality of stiffening elements 113 which are spaced apart from one another in the channel direction. In the illustrated embodiment of FIGS. 2–4B, stiffening elements 113 corresponding to different channels 112 are aligned with one another, although this is not necessary.

Sidewalls 132A, 132B may be oriented to converge toward one another as they extend generally in the inward direction indicated by arrow 138 (see FIG. 4). With this configuration, channel 112 is relatively wide at channel opening 136 and relatively narrow at its innermost extent. The angle θ (FIG. 4A) between sidewalls 132A, 132B is typically in the range of 0 degrees to 30 degrees. In the illustrated embodiment of FIGS. 2–4B, sidewalls 132A, 132B extend inwardly until they reach base 134. Base 134 extends between sidewalls 132A, 132B at the inner ends thereof. In other embodiments, base 134 is not necessary and sidewalls 132A, 132B may have a variety of different cross-sectional profiles.

A substrate 111A which defines channels 112 is preferably formed using an injection molding process. In other embodiments, substrate 111A is fabricated using conventional machining techniques, spin casting or other casting techniques, vacuum forming techniques, rotational molding techniques or other fabrication techniques. Substrate 111A and in particular sidewalls 132A, 132B are preferably formed from a relatively soft material, such as plastic, aluminum or other soft metals for example. Particular types of plastic suitable for sidewalls 132A, 132B include: polystyrene, polyvinyl chloride, polycarbonate, polypropylene, high density polypropylene, acrylonitrile-butadiene-styrene or the like. Preferably, plastics used to form sidewalls 132A, 132B are sufficiently deformable to be deformed when fasteners 10 are inserted therein and are sufficiently strong to prevent fasteners 10 from being removed by forces directed in an outward direction.

In other embodiments, sidewalls 132A, 132B are formed from multiple layers of different materials, where the layers that form the surfaces of sidewalls 132A, 132B comprise relatively soft material and other layers of sidewalls 132A, 132B comprise harder materials.

FIG. 4B shows a screw 10 that has been driven into a channel 112 through an aperture 140 in a lug of a component 114. In some embodiments, channel 112 has a depth in a range of 1/4 inch to 2 inches. In preferred embodiments, channel 112 has a depth in a range of 1/4 inch to 3/4 inches. Preferably, the tip portion 20 of screw 10 is narrower than the width of channel opening 136, so that screw 10 can be easily started into channel 112. However, at least a portion of channel 112 is narrower than a nominal diameter of screw 10 (i.e. shaft 12 and its threads 14). Preferably, at least a portion of channel 112 has a transverse dimension that is 85% or less than the nominal diameter of screw 10. Such a portion may comprise 60% or more of the depth of channel 112 (i.e. the distance between channel opening 136 and the innermost extent of channel 112). Table I provides some examples of screw sizes and corresponding channel widths. For a given screw size, channels 112 preferably have at least a portion which has a transverse dimension that is less than or equal to the channel widths listed in Table I.

TABLE I

EXAMPLE CHANNEL WIDTHS

| SCREW SIZE | NOMINAL SCREW DIAMETER (Inches) | EXAMPLE CHANNEL WIDTH (Inches) |
|---|---|---|
| No. 6 | 0.138 | 0.113 |
| No. 8 | 0.164 | 0.136 |
| No. 10 | 0.190 | 0.159 |
| No. 12 | 0.216 | 0.177 |

As screw 10 is rotated and driven into channel 112, its threads 14 cut into (or otherwise deform) the relatively soft material of sidewalls 132A, 132B to form deformations 142A, 142B in sidewalls 132A, 132B. Deformations 142A, 142B may be indentations. Threads 14 abut against the inward and/or outward sides of their corresponding deformations 142A, 142B. Consequently, fastener 10 is prevented from moving significant distances in the inward and/or outward direction without rotating screw 10.

In some embodiments, shaft 12 of screw 10 may be sufficiently wide as to cause sidewalls 132A, 132B to deform in transverse directions to accommodate the width of shaft 12. Stiffening elements 113 help to prevent sidewalls 132A, 132B from deforming too far in the transverse direction. In some embodiments, sidewalls 132A, 132B are sufficiently rigid, strong and/or well supported to permit only limited transverse deformation without requiring stiffening elements 113.

In some cases, screw 10 may be inserted into channel 112 in a location adjacent to a stiffening element 113. In such cases, threads 14 of screw 10 may cut into (or otherwise deform) stiffening element 113 to form deformations (not shown) in stiffening element 113 in addition to deformations 142A, 142B in sidewalls 132A, 132B. Such deformations in stiffening element 113 may help to secure screw 10 in channel 112.

Referring to FIG. 2, substrate 11A may include preformed holes 115 (in addition to channels 112) and one or more of screws 10A, 10B may be inserted into one or more corresponding holes 115. In such cases, threads 14 of screw 10 may cut into (or otherwise deform) the walls of hole 115 to form deformations (not shown). Such deformations in the walls of hole 115 act in conjunction with threads 14 to secure screw 10 in hole 115.

Referring to FIG. 2, if it ever becomes necessary to adjust the position of a component 114 within enclosure 110, then screws 10A, and/or 10B can be unscrewed, component 114 can be moved to its new position and screws 10A and 10B can be reinserted into channels 112 and/or holes 115.

Figure 5:
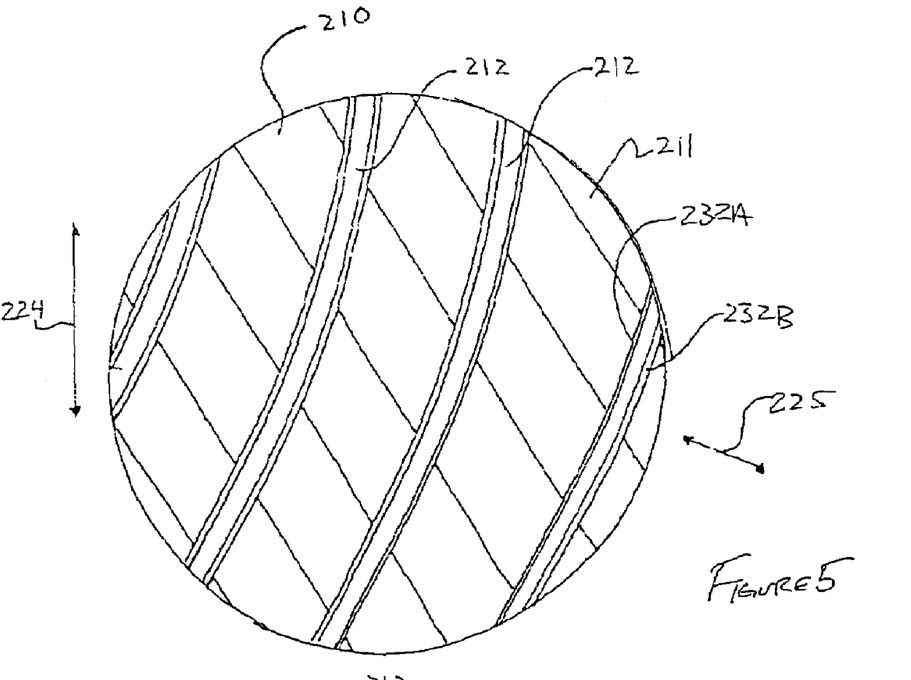
FIG. 5 depicts a top plan view of fastener receiving channels according to an alternative embodiment of the invention, wherein the channels have a curved profile.

FIG. 5 shows a junction box 210 having a substrate 211 which incorporates a plurality of fastener receiving channels 212 according to an alternative embodiment of the invention. Channels 212 and their corresponding sidewalls 232A, 232B follow curved paths. Substrate 211 comprises a plurality of similarly curved fastener receiving channels 212 that follow one another and are spaced apart from one another in a transverse direction 225. A screw 10 may be inserted at any location along any of the channels 212. Apart from being curved, channels 212 are constructed in substantially the same way as channels 112.

Figure 6:
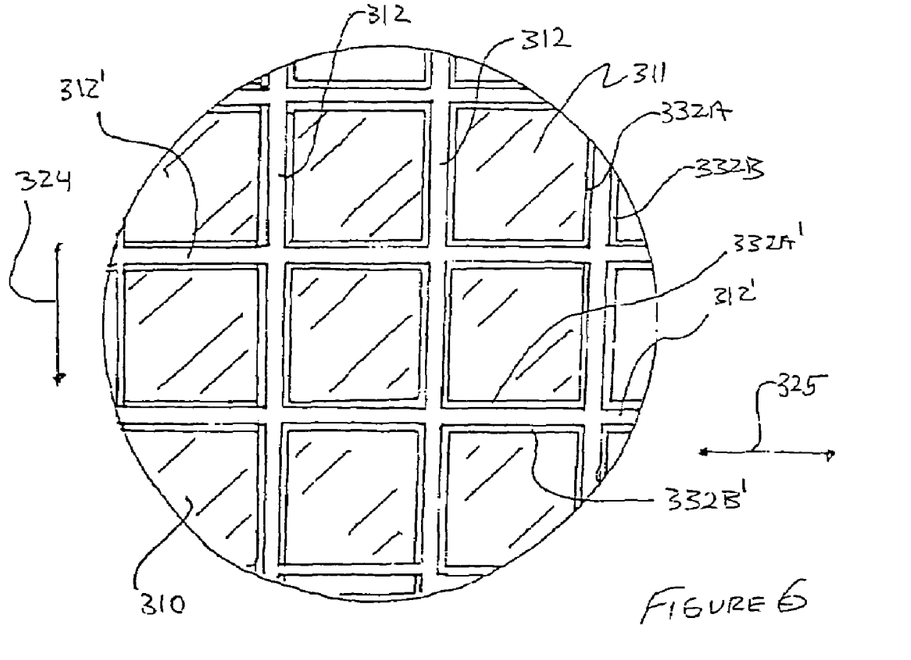
FIG. 6 depicts a top plan view of fastener receiving channels according to a further alternative embodiment of the invention, wherein the channels are intersecting.

FIG. 6 shows a junction box 310 having a substrate 311 which incorporates a first plurality of fastener receiving channels 312 and a second plurality of intersecting fastener receiving channels 312' in accordance with another alternative embodiment of the invention. Channels 312 intersect with channels 312' and vice versa. Channels 312 extend in a first channel direction indicated by arrow 324. Channels 312' extend in a second channel direction indicated by arrow 325. In general, channels 312 may be spaced apart from one another with a spacing which is the same as, or different from a spacing with which channels 312' are spaced apart from one another. As shown in FIG. 6, channels 312 intersect with channels 312', such that their respective sidewalls 332A, 332B, 332A', 332B' have gaps at the intersection locations.

It can be appreciated that the various arrangements of channels described herein each provide a great deal of flexibility for positioning and/or repositioning components on the substrate wherein the channels are defined. However, those skilled in the art will appreciate that there are other suitable arrangements and patterns of channels which may provide similar flexibility for positioning and/or repositioning components on the substrate. The invention should be understood to include such channel arrangements.

Figure 7:
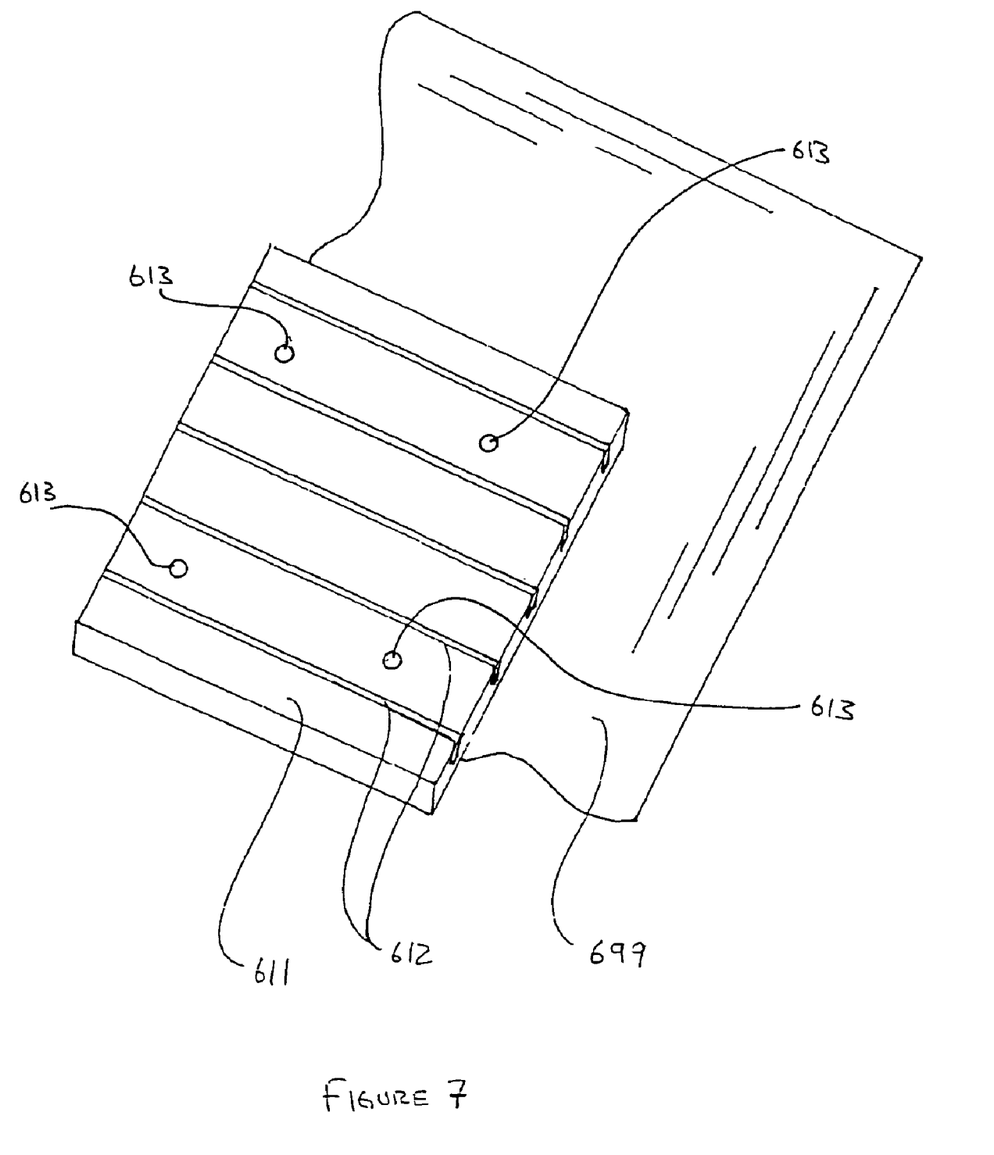
FIG. 7 is an isometric view of a generalized plate component which comprises fastener receiving channels in accordance with a particular embodiment of the invention.

FIG. 7 is an isometric view of a fastener receiving component having a substrate in the form of a plate component 611 in accordance with a particular embodiment of the invention. Plate component 611 is shaped to define fastener receiving channels 612. Plate component 611 may be coupled to any surface 699 to provide surface 699 with channels 612 for receiving fasteners. In general, plate component 611 may be coupled to surface 699 using any suitable coupling means. For example, plate component 611 may be coupled to surface 699 using an adhesive, using one or more fasteners, by a resiliently deformable "snap-together" fit or the like. In the illustrated embodiment, plate component 611 comprises holes 613 through which fasteners may project to mount plate component 611 to surface 699. Surface 699 may be an interior surface of a junction box enclosure (not shown). In accordance with the embodiment of FIG. 7, components may be mounted in the interior of an enclosure by mounting the parts to the channels 612 and/or to holes 613 of plate component 611 as discussed above. Plate component 611 may then be retrofitted to an existing junction box enclosure by fastening it within the enclosure.

As will be apparent to those skilled in the art in the light of the foregoing disclosure, many alterations and modifications are possible in the practice of this invention without departing from the spirit or scope thereof. For example:

Screw 10 shown in FIG. 1 is only an example of one particular type of threaded fastener that may be used to engage channels. Those skilled in the art will appreciate that there is a wide variety of threaded fasteners, many of which are suitable for use with the channels of the present invention. Such threaded fasteners may include bolts which are normally fastened to nuts for example. Such threaded fasteners are not necessarily narrower at their tips.

As discussed above, channels 112 are preferably made from a relatively soft material such as plastic. Although less desirable for housing electrical connections, channels 112 may be formed from other deformable materials, such as aluminum, steel or other metals, and wood for example.

In particular embodiments of the invention that incorporate curved channels 212 of the type shown generally in FIG. 5, channels 212 may follow arcuate or even circular paths. That is, the sidewalls 232A, 232B of channels 212 may each have a constant radius of curvature.

Figure 4C:
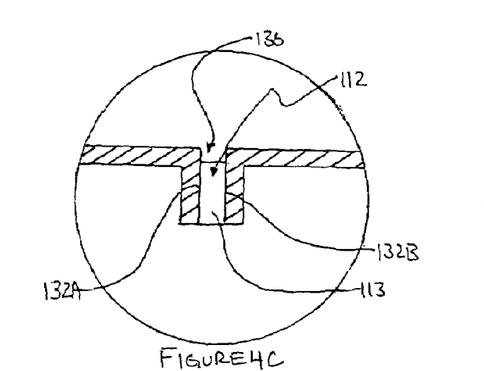
FIGS. 4C through 4J show various possible alternative cross-sectional profiles for channels in accordance with the invention.
Figure 4D:
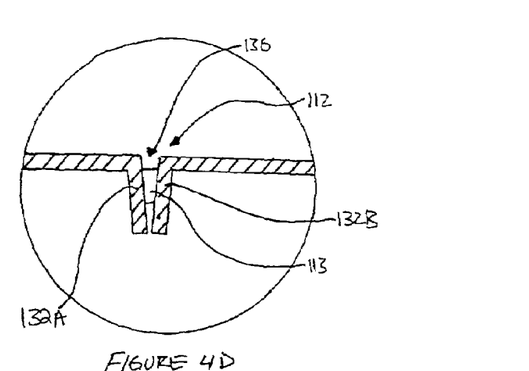
Figure 4E:
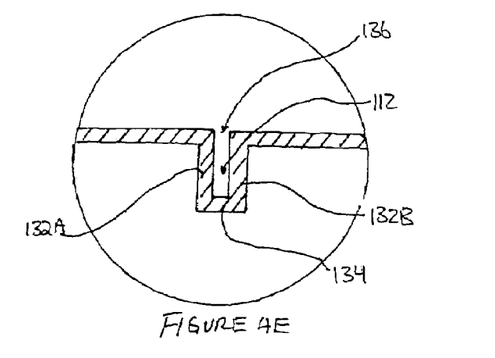
Figure 4F:
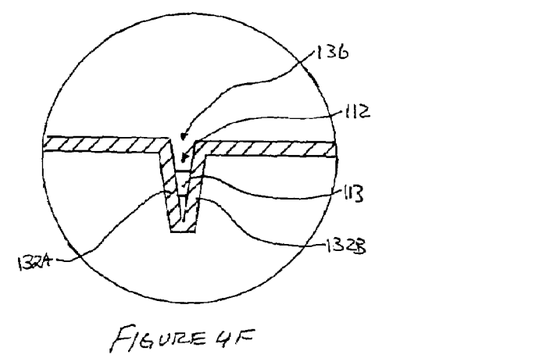
Figure 4G:
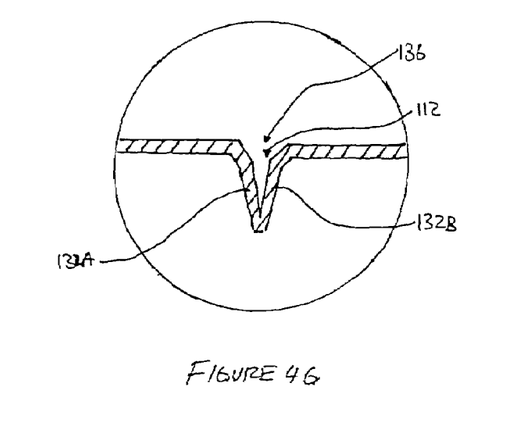
Figure 4H:
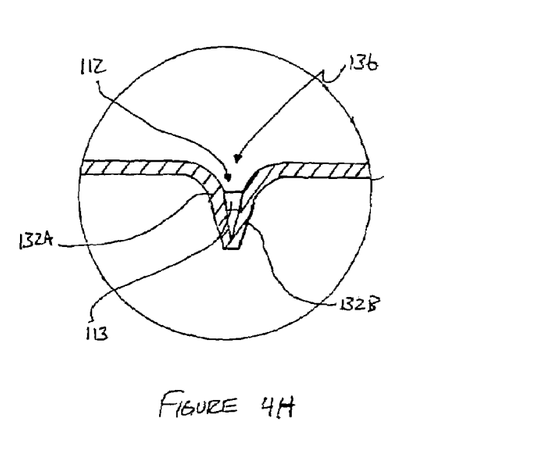
Figure 4I:
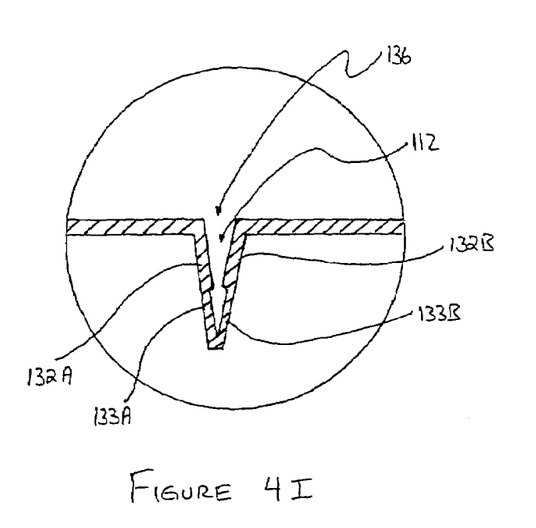
Figure 4J:
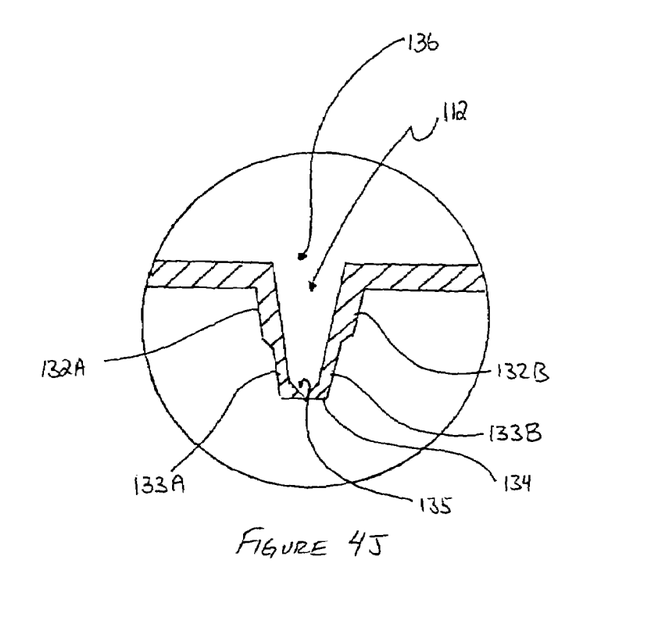

FIGS. 4C–4J depict a number of cross-sectional profiles of channels 112 in accordance with alternative embodiments of the invention. In the embodiment of FIG. 4C, sidewalls 132A, 132B are parallel as they extend inwardly and channel 112 is open at its innermost extent. In the embodiment of FIG. 4C, stiffening element 113 is recessed from the outer channel opening 136 of channel 112. In the embodiment of FIG. 4D, sidewalls 132A, 132B converge towards one another as they extend inwardly, but channel 112 is still open at its innermost extent. In the embodiment of FIG. 4D, stiffening element 113 is recessed from the outer channel opening 136 and from the innermost extent of channel 112. In the embodiment of FIG. 4E, sidewalls 132A, 132B are parallel as they extend inwardly and channel 112 has a base 134 at its innermost extent. In the embodiment of FIG. 4E, there are no stiffening elements. In the embodiment of FIG. 4F, sidewalls 132A, 132B have a full V-shaped cross-sectional profile, where sidewalls 132A, 132B converge to meet one another to form a line that extends in the channel direction at an innermost portion of channel 112. In the embodiment of FIG. 4F, stiffening element 113 is recessed from the outer channel opening 136 and from the innermost extent of channel 112. In the embodiment of FIG. 4G, sidewalls 132A, 132B comprise portions with different angular profiles, such that the angle between sidewalls 132A, 132B is larger at channel opening 136 and smaller at the inner portions of channel 112. In the embodiment of FIG. 4G, sidewalls 132A, 132B converge to form a line that extends in the channel direction and there are no stiffening elements. In the embodiment of FIG. 4H, sidewalls 132A, 132B are curved in cross-sectional profile. In the embodiment of FIG. 4H, stiffening element 113 is recessed from the outer channel opening 136 and from the innermost extent of channel 112. FIG. 4I represents an embodiment of channel 112 where portions 133A, 133B of sidewalls 132A, 132B have a width that is less than that of the remainder of sidewalls 132A, 132B. Reduced width portions 133A, 133B may make it easier to fabricate channels 112 and may also save material. FIG. 4J represents an embodiment of channel 112 where portions 133A, 133B of sidewalls 132A, 132B have a width that is less than that of the remainder of sidewalls 133A, 132B. In the embodiment of FIG. 4J, base 134 is provided with an angled interior profile 135. Angled interior profile 135 and reduced width portions 133A, 133B may make it easier to fabricate channels 112 and may also save material.

The discussion presented above describes the inventive fastener receiving channels of the present invention in the context of mounting components in a junction box. In general, there is no requirement that the channels of the present invention be used in such a context. The channels of the present invention may generally be provided on any substrate for receiving fasteners.

Accordingly, the scope of the invention is to be construed in accordance with the substance defined by the following claims.

What is claimed is:

1. A system for attachably receiving threaded fasteners at various locations, the system comprising:
a substrate comprising a pair of sidewalls which extend parallel to one another in a first channel direction and which have channel-defining surfaces that are spaced apart from one another in a transverse direction to define an elongated first channel therebetween,
wherein one or more threaded fasteners are rotatably insertable through a channel opening and inwardly into the first channel at one or more corresponding locations along the first channel,
wherein the sidewalls are formed from a deformable material, such that during rotational insertion of each threaded fastener into the first channel one or more threads of the threaded fastener create one or more deformations in the sidewalls, the one or more deformations cooperative with the one or more threads to retain the threaded fastener between the sidewalls, and wherein the channel-defining surfaces of the sidewalls converge toward one another as they extend inwardly from the channel opening until they meet one another at an innermost extent of the first channel.

2. A system according to claim 1 wherein the one or more deformations comprise one or more indentations in which the one or more threads are located after rotational insertion of the threaded fastener into the first channel.

3. A system according to claim 2 wherein the substrate comprises a plurality of first channels, each of the plurality first channels defined by a corresponding pair of channel-defining surfaces of a corresponding pair of sidewalls which extend parallel to one another in the first sidewall direction and which are spaced apart in the transverse direction, and wherein the plurality of first channels are spaced apart from one another in the transverse direction over an area of the substrate.

4. A system according to claim 3 wherein each of the plurality of first channels is substantially straight.

5. A system according to claim 3 wherein each of the plurality of first channels is curved.

6. A system according to claim 5 wherein a curvature of each of the plurality of first channels has a constant radius.

7. A system according to claim 3 wherein the sidewalls comprise a plastic material.

8. A system according to claim 7 wherein the plastic material is selected from the group consisting of: polystyrene, polyvinyl chloride, polycarbonate, polypropylene, high-density polypropylene and acrylonitrile-butadiene-styrene.

9. A system according to claim 3 comprising means for coupling the substrate to a surface.

10. A system according to claim 3 comprising a junction box enclosure, wherein the substrate is coupled to a surface of the junction box enclosure.

11. A system according to claim 3 wherein the substrate is part of a surface of a junction box enclosure.

12. A system according to claim 3 wherein a spacing between adjacent first channels in the transverse direction is in a range of ⅛ of an inch to 6 inches.

13. A system according to claim 3 wherein a spacing between adjacent first channels in the transverse direction is in a range of 1.5 to 10 times an average distance between the sidewalls of one of the first channels in the transverse direction.

14. A system according to claim 1 wherein the channel-defining surfaces converge at an angle of 30 degrees or less, with respect to one another over the entire extent of the channel defining surfaces between the channel opening and the innermost extent of the first channel.

15. A system according to claim 14, wherein the substrate comprises one or more stiffening elements extending in the transverse direction across the first channel between the sidewalls at one or more corresponding locations, the one or more corresponding locations spaced apart from one another in the first channel direction along the first channel and the one or more corresponding locations spaced apart, in the first channel direction, from endwalls which define the extremities of the first channel.

16. A system according to claim 15 wherein during rotational insertion of a threaded fastener into the first channel in a location adjacent to a stiffening element, one or more threads of the threaded fastener create one or more deformations in the stiffening element, the one or more deformations cooperative with the one or more threads to help retain the threaded fastener in the first channel.

17. A system according to claim 15 wherein each of the one or more stiffening elements extends inwardly from the channel opening of the first channel to the innermost extent of the first channel.

18. A system according to claim 15 wherein each of the one or more stiffening elements is inwardly recessed from the channel opening of the first channel.

19. A system according to claim 15 wherein each of the one or more stiffening elements is outwardly recessed from the innermost extent of the first channel.

20. A system according to claim 15 wherein the substrate comprises a plurality of first channels, each of the plurality first channels defined by a corresponding pair of channel-defining surfaces of a corresponding pair of sidewalls which extend parallel to one another in the first sidewall direction and which are spaced apart in the transverse direction, and wherein the plurality of first channels are spaced apart from one another in the transverse direction over an area of the substrate.

21. A system according to claim 20 wherein the one or more stiffening elements extend in the transverse direction between the corresponding sidewalls of adjacent first channels at the one or more corresponding locations.

22. A system according to claim 1 wherein the sidewalls comprise a softer material overlying a harder material, the softer material forming the channel-defining surfaces of the sidewalls.

23. A system according to claim 1 wherein a thickness of the sidewalls is in a range of $1/20$ to $1/4$ of an inch.

24. A system according to claim 1 wherein a thickness of the sidewalls is in a range of $1/4$ to $2 1/2$ times an average transverse distance between the sidewalls.

25. A system according to claim 1 wherein a distance in the transverse direction between sidewalls in at least a portion of the first channel is 85% or less than a nominal diameter of the one or more threaded fasteners.

26. A system according to claim 25 wherein the portion of the first channel that is 85% or less than the nominal diameter of the one or more threaded fasteners comprises 60% or more of a distance between the channel opening and the innermost extent of the first channel.

27. A system according to claim 1 comprising at least one component wherein at least one of the one or more threaded fasteners project through an aperture in the component before being rotationally inserted into the first channel so as to mount the component to the substrate.

28. A system according to claim 27 wherein one or more preformed holes are defined in the substrate and wherein at least one of the one or more threaded fasteners projects through a second aperture in the component and is rotationally inserted into one of the preformed holes so as to mount the component to the substrate.

29. A system according to claim 1 wherein first sections of the channel-defining surfaces converge toward one another at a first angular orientation as they extend inwardly from the channel opening into the channel and second sections of the channel-defining surfaces converge toward one another at a second angular orientation as they extend inwardly from respective first sections of the channel-defining surfaces until the second sections of the channel-defining surfaces meet at the innermost extent of the first channel.

30. A system according to claim 29 wherein a thickness of the sidewalls in a region of the first sections of the channel-defining surfaces is greater at the channel opening than at locations spaced inwardly from the channel opening.

31. A system according to claim 29 wherein a thickness of the sidewalls in a region of the second sections of the channel-defining surfaces is greater near the first sections of the channel-defining surfaces than at the innermost extent of the first channel.

32. A system according to claim 29 wherein a thickness of the sidewalls in a region of the first sections of the channel-defining surfaces is greater than a thickness of the sidewalls in a region of at least a portion of the second sections of the channel-defining surfaces.

33. A system according to claim 32 wherein the region of at least the portion of the second sections of the channel-defining surfaces is spaced inwardly apart from the region of the first sections of the channel-defining surfaces.

34. A system according to claim 29 wherein an innermost extent of the channel lies on a plane that extends in the first channel direction and bisects the channel in the transverse direction and wherein a thickness of the sidewalls at the innermost extent of the channel is less than a thickness of the sidewalls at locations away from the plane.

* * * * *